(12) United States Patent
Chen et al.

(10) Patent No.: US 9,195,730 B2
(45) Date of Patent: Nov. 24, 2015

(54) VERIFYING CORRECTNESS OF A DATABASE SYSTEM VIA EXTENDED ACCESS PATHS

(75) Inventors: Dong Sheng Chen, Beijing (CN); Yan Jia, Beijing (CN); Shu Hua Liu, Beijing (CN); Ke Wei Wei, Beijing (CN); Xin Ying Yang, Beijing (CN); Jing Zhou, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/252,447

(22) Filed: Oct. 4, 2011

(65) Prior Publication Data
US 2012/0173498 A1    Jul. 5, 2012

(30) Foreign Application Priority Data
Dec. 30, 2010   (CN) .......................... 2010 1 0624761

(51) Int. Cl.
*G06F 7/00*       (2006.01)
*G06F 17/30*      (2006.01)

(52) U.S. Cl.
CPC ................................ *G06F 17/30595* (2013.01)

(58) Field of Classification Search
None
See application file for complete search history.

(56) References Cited

U.S. PATENT DOCUMENTS

| | | | |
|---|---|---|---|
| 5,588,150 A * | 12/1996 | Lin et al. .................... 707/774 |
| 5,734,884 A * | 3/1998 | Eberhard et al. .................. 1/1 |
| 5,940,819 A * | 8/1999 | Beavin et al. ................... 1/1 |
| 6,240,418 B1 * | 5/2001 | Shadmon ..................... 707/696 |
| 6,421,663 B1 | 7/2002 | Chen et al. |
| 7,080,062 B1 | 7/2006 | Leung et al. |
| 7,337,169 B2 | 2/2008 | Galindo-Legaria et al. |
| 7,685,194 B2 * | 3/2010 | Kabra et al. .................. 707/719 |
| 8,055,635 B2 * | 11/2011 | Hsu et al. ..................... 707/698 |
| 2003/0018618 A1 * | 1/2003 | Bestgen et al. .................. 707/3 |
| 2003/0182276 A1 * | 9/2003 | Bossman et al. ................. 707/3 |
| 2004/0205089 A1 * | 10/2004 | Alon et al. .................... 707/200 |
| 2005/0177557 A1 * | 8/2005 | Ziauddin et al. .................. 707/3 |
| 2005/0262046 A1 * | 11/2005 | Day et al. ......................... 707/2 |
| 2006/0206477 A1 * | 9/2006 | Dalvi et al. ...................... 707/5 |
| 2007/0073647 A1 * | 3/2007 | Au et al. .......................... 707/2 |
| 2007/0219973 A1 * | 9/2007 | Cui et al. .......................... 707/4 |

(Continued)

OTHER PUBLICATIONS

The SQL Compiler Process, http://www.ibm.com/support/docview.wss?rs=71&uid=swg21370360, Jul. 19, 2011, pp. 1-3.

(Continued)

*Primary Examiner* — Tony Mahmoudi
*Assistant Examiner* — Michael Le
(74) *Attorney, Agent, or Firm* — Mohammed Kashef; Edell, Shapiro & Finnan, LLC (57) ABSTRACT

The invention provides for verifying correctness of a database system. A SQL instruction is received and access paths of the received SQL instruction are extended. The SQL instruction is executed by using the extended access paths, and the correctness of the database system is verified according to results of executing the SQL instruction. With the method and system of the invention, the object of verifying correctness of a database system by automatically extending access paths of SQL statement may be achieved, and the object of verifying correctness of a database system scientifically, effectively and purposefully based on ratio of error or defect present in database itself due to various data manipulation approaches (different values of access path elements) may also be achieved.

18 Claims, 6 Drawing Sheets

(56) References Cited

U.S. PATENT DOCUMENTS

| | | |
|---|---|---|
| 2007/0282794 A1 | 12/2007 | Barsness et al. |
| 2008/0010240 A1 | 1/2008 | Zait |
| 2009/0030888 A1 | 1/2009 | Sahu et al. |
| 2009/0271360 A1* | 10/2009 | Bestgen et al. ............... 707/2 |
| 2009/0327242 A1* | 12/2009 | Brown et al. ............... 707/3 |
| 2010/0030758 A1 | 2/2010 | Belknap et al. |
| 2010/0125565 A1* | 5/2010 | Burger et al. ............ 707/713 |
| 2011/0161310 A1* | 6/2011 | Tang et al. ............ 707/714 |
| 2012/0124414 A1* | 5/2012 | Dallas et al. ............ 714/6.2 |
| 2013/0159286 A1* | 6/2013 | Manzano Macho et al. . 707/718 |

OTHER PUBLICATIONS

Oracle Database Performance Tuning Guide, 10g Release 1(10.1), Parts No. B10752-01, Dec. 2003, 572 pages.

Fuh et al., Tuning SQL with Optim Query Tuner, Part 1: Understanding Access Paths, Jun. 17, 2010, pp. 1-19.

* cited by examiner

VERIFYING CORRECTNESS OF A DATABASE SYSTEM VIA EXTENDED ACCESS PATHS

CROSS REFERENCE TO RELATED APPLICATIONS

This application claims priority under 35 U.S.C. §119 to Application No. CN 201010624761.6, filed on 30 Dec. 2010 and entitled "System and Method for Access Path Extension Based RDBMS Test and Verification," the disclosure of which is hereby incorporated by reference in its entirety.

FIELD OF THE INVENTION

The invention relates to the field of database technology. More particularly, the invention relates to the technology of verifying correctness of a relational database system.

BACKGROUND

In the field of information technology (IT), a database, especially a relational database, is more and more widely used. A database is used to store tremendous amounts of data, and people usually use a Structured Query Language (SQL) statement to perform query, insertion, deletion and other operations on data in a relational database. Taking a SQL query statement (SELECT statement) for example, the statement indicates what kind of data is to be queried, but does not tell a relational database management system (RDBMS) how to query such data. There may be various possible ways to query the data. As a result, a RDBMS needs to parse the SQL statement, and generate according to various policies the most reasonable way of acquiring the data, called an access path. The access path is the specific steps regarding how to acquire the wanted data. A RDBMS executes the SQL statement according to the specific steps indicated by the access path, so as to finally acquire the queried data.

However, with the increasing complexity of a RDBMS, incorrect output of the SQL statement may occur. The reason for the incorrect output may be varied, but the main reason can be concluded as a defect or logic error in the RDBMS itself. Thus, how to test and verify correctness of a RDBMS becomes an important problem in the field of databases.

Currently, there are some technical solutions for verifying correctness of a database system, for example, a white box test and black box test. The so-called "white box test" refers to a design test case directly according to code logic of the database. Whereas the "black box test" refers to a write test case (generally, write various SQL statements) by using an external interface according to a functional description of a product without going deep into code. Since a database system itself is very complex, it is difficult for either the white box test or black box test to cover various conditions, and correctness of database system cannot be verified purposefully. Further, writing a test case is a time-consuming and tiring task, and a tester needs to thoroughly understand the database system, which greatly affects test efficiency.

BRIEF SUMMARY

An aspect of the invention provides a method and apparatus that can verify correctness of a database system automatically through a received SQL statement (instruction). Another object of the invention is to provide a method and apparatus that can verify correctness of a database system purposefully by extending access paths of a SQL statement. According to another aspect of the invention, there is provided a method for verifying correctness of a database system, comprising: receiving a SQL instruction; extending access paths of the received SQL instruction; executing the SQL instruction by using the extended access paths; and verifying correctness of the database system according to a result of executing the SQL instruction.

According to an embodiment of the invention, extending access paths of the received SQL instruction comprises: acquiring elements constituting an access path of the SQL instruction; extending the elements; and combining possible values of the elements to generate the extended access paths.

According to another aspect of the invention, there is provided a system for verifying correctness of a database system, comprising: a receiving apparatus configured to receive a SQL instruction; an access path extending apparatus configured to extend access paths of the received SQL instruction; an executing apparatus configured to execute the SQL instruction by using the extended access paths; and a verifying apparatus configured to verify correctness of the database system according to a result of executing the SQL instruction.

With the method and system of the invention, verifying correctness of a database system by automatically extending access paths of a SQL statement may be achieved. In addition, verifying correctness of a database system scientifically, effectively and purposefully based on a ratio of error or defect present in the database itself due to various data manipulation approaches (different values of access path elements) may also be achieved.

BRIEF DESCRIPTION OF THE SEVERAL VIEWS OF THE DRAWINGS

From the detailed description of embodiments shown in conjunction with accompanying drawings, in which the same reference number in the accompanying drawings of the invention represent the same or similar elements, the above and other features of the invention will become more apparent.

DETAILED DESCRIPTION

Figure 1:
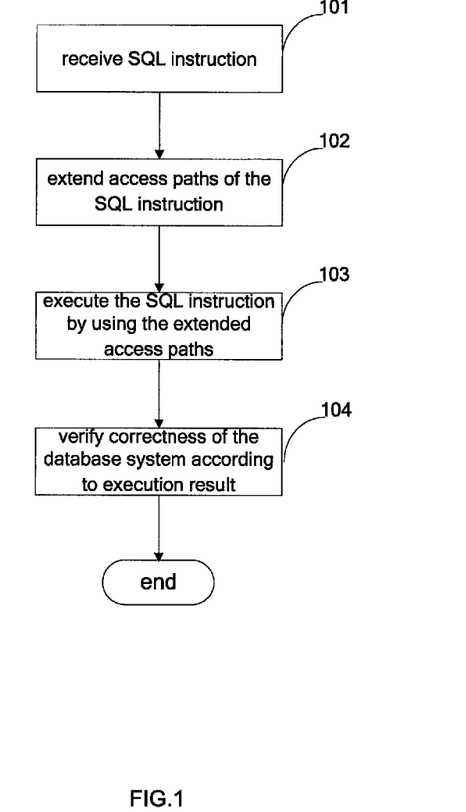
FIG. 1 shows a flow chart of a method for verifying correctness of a database system according to an embodiment of the invention.

FIG. 1 shows a flow chart of a method for verifying correctness of a database system according to an embodiment of the invention. The method shown in FIG. 1 starts with step 101. In step 101, a SQL instruction is received. A SQL instruction is also referred to as a SQL statement. It is a language for database querying and programming and is used for accessing data and querying, updating and managing a relational database system. There are many types of SQL instructions, such as INSERT (insert), UPDATE (modify), DELETE (delete), and SELECT (query) and the like. A database system will parse a SQL instruction after a piece of the SQL instruction is received, analyze and acquire an optimal access path to execute the SQL instruction, and output a result of executing the SQL instruction. The phrase "access path" refers to a database system's specific execution method for a SQL instruction. An access path is composed of many elements, and there are many possible values for each element. For example, an access path element includes, but is not limited to, Access Method, Join Method, Index Only, Table Access, Prefetch, Parallelism Mode and the like. As to the above illustrative access path elements, taking Access Method for example, it has three possible values: Table Scan (RSCAN), Index Scan (ISCAN), and Multi-Index Scan (MISCAN). Taking Join Method for example, it has three possible values: Sort Merge Join (SMJ), Nested Loop Join (NLJ) and Hybrid Join (HYJ). Preferably, for the purpose of verifying correctness of a database system, the SQL statement received in step 101 is a query (SELECT) statement. A SELECT statement differs from INSERT (insert), UPDATE (modify) and DELETE (delete) statements in that, it may involve multiple access path elements such as Join Method, Prefetch and the like and may extend an access path. Of course, if a piece of a non-SELECT statement has a SELECT sub-statement nested therein, it also belongs to the SELECT statement referred to herein.

Next, in step 102, access paths of the received SQL instruction are extended. Since a piece of a SQL instruction may have multiple possible access paths, and a database system generally selects through analysis an optimal access path to execute when executing a piece of the SQL instruction, the "extension" performed in step 102 refers to extending and acquiring multiple possible access paths corresponding to the received SQL instruction. According to an embodiment of the invention, the extension performed in step 102 refers to extending and acquiring all possible access paths of the SQL instruction. According to another embodiment of the invention, the extension performed in step 102 refers to selectively extending and acquiring part of possible access paths of the SQL instruction. How to selectively extend may be performed with reference to the method about selecting a part of extended access paths in the description below with respect to FIG. 2. As to the specific method of extending access paths, according to an embodiment of the invention, extending access paths is implemented by combining possible values of elements in an access path (which will be described in detail below with reference to FIG. 2). Of course, those skilled in the art should appreciate that, extending access paths by extending elements is only one possible extending approach, no matter what kinds of extending approaches are employed, as long as extension of access paths can be realized, they all fall into the protection scope of the invention.

Next, in step 103, the SQL instruction is executed by using the extended access paths. As described above, the processing of a SQL instruction by a database is realized by executing access paths of the SQL instruction. Since multiple possible access paths have been acquired through extension in step 102, the multiple possible access paths corresponding to a same SQL statement may be executed respectively in step 103.

In step 104, correctness of the database system is verified according to a result of executing the SQL instruction. Since the executed multiple access paths correspond to a same SQL statement, in the case there is no error or defect in the database system itself, execution of all extended access paths should acquire the same output results. Thus, according to an embodiment of the invention, verifying correctness of the database system according to results of executing the SQL instruction is realized by judging whether there is different output results after multiple extended access paths are executed. It can be deemed that there is an error or defect in the database system as long as the output results after executing one access path are different from the results after executing other access paths.

It can be seen from the method shown in FIG. 1 and the above description that, with the method provided by the invention, access paths of a received SQL instruction may be extended based on the received SQL instruction, and a technical effect of verifying correctness of the database system by checking execution results of extended access paths can be realized.

Figure 2:
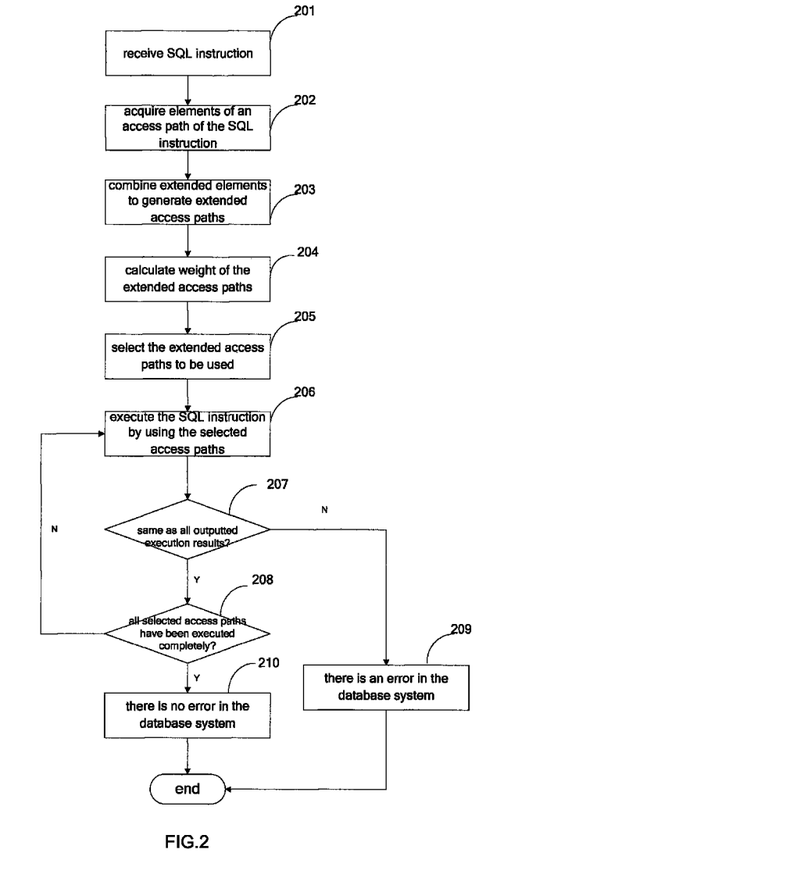
FIG. 2 shows a flow chart of a method for verifying correctness of a database system according to another embodiment of the invention.

FIG. 2 shows a flow chart of a method for verifying correctness of a database system according to another embodiment of the invention. The method shown in FIG. 2 starts with step 201. In step 201, a SQL instruction is received, which is similar to step 101 in the method shown in FIG. 1 and will be omitted for brevity.

Next, the method proceeds to step 202, in which elements of an access path of the received SQL instruction are acquired. Those skilled in the art should appreciate that, current relational database management system RDBMS products will all parse a SQL instruction and generate an optimal access path analyzed by a database engine, and execute the access path so as to output a result for the SQL instruction. The procedure of analyzing an optimal access path of a SQL instruction by database engine is realized by determining values of respective elements constituting the access path one by one. Thus, how to acquire elements in an access path of a SQL instruction belongs to solutions in the art, and will be omitted for brevity.

In step 203, possible values of the access path elements acquired in step 202 are combined to generate extended access paths. Generally, the process a database system performs on a SQL instruction is to attempt to find a most reasonable and optimal access path, that is, to uniquely determine values of respective elements in an access path and drop other possible values. In the present invention, in order to verify correctness of a database system, more possible values need to be assigned to elements in the access path and these elements having multiple possible values are combined together. For example, assume that an access path of a SQL instruction includes two elements: Access Method and Join Method, as to the Access Method element, there are three possible values, RSCAN, ISCAN and MISCAN respectively; as to the Join Method, there are also three possible values, SMJ, NLJ and HYJ respectively. Then according to step 203 and 204, the number of finally extended access paths is 9, that is, Access Method (RSCAN)→Join Method (SMJ), Access Method (RSCAN)→Join Method (NLJ), Access Method (RSCAN)→Join Method (HYJ), Access Method (ISCAN) →Join Method (SMJ) . . . and so on, respectively.

After the extended access paths are generated in step 203, weights of the extended access paths are calculated in step 204. The reason for calculating weights of the extended access paths is that, generally, as to a SQL instruction, its access paths may contain many elements, and each element may have multiple possible values, thus, a number of access paths acquired through extension will be very huge. If a database system executes all the extended access paths one by one in subsequent operations, it will be very time consuming, resource consuming, and inefficient. In order to select those access paths that are most likely to embody a presence of an error in the database system, weights of the extended access paths are calculated in step 205. According to an embodiment of the invention, weights of the extended access paths are calculated according to a weight of elements in the access paths and historical error information. The weight of an element is the weight of the element itself in each access path, which embodies a ratio that an erroneous SQL instruction result output by a database may be caused by the element. For example, a weight of an Access Method element is 0.1, a weight of a Join Method element is 0.4, which means that it is more possible for a Join Method element to lead to a database error than an Access Method element. According to an embodiment of the invention, a weight of an element is defined by a user, product support and/or service personnel after a database system product is released. According to another embodiment of the invention, a weight of an element is predefined by a developer and tester before a database system product is released. According to still another embodiment of the invention, a weight of an element may be dynamically adjusted in a lifecycle of a database system product. The "historical error information" refers to a ratio of a respective solution (i.e. respective possible value) contained in each element in a case that an error occurs during execution of a SQL instruction. The meaning of "historical error information" may be better understood with reference to FIG. 3.

Figure 3:
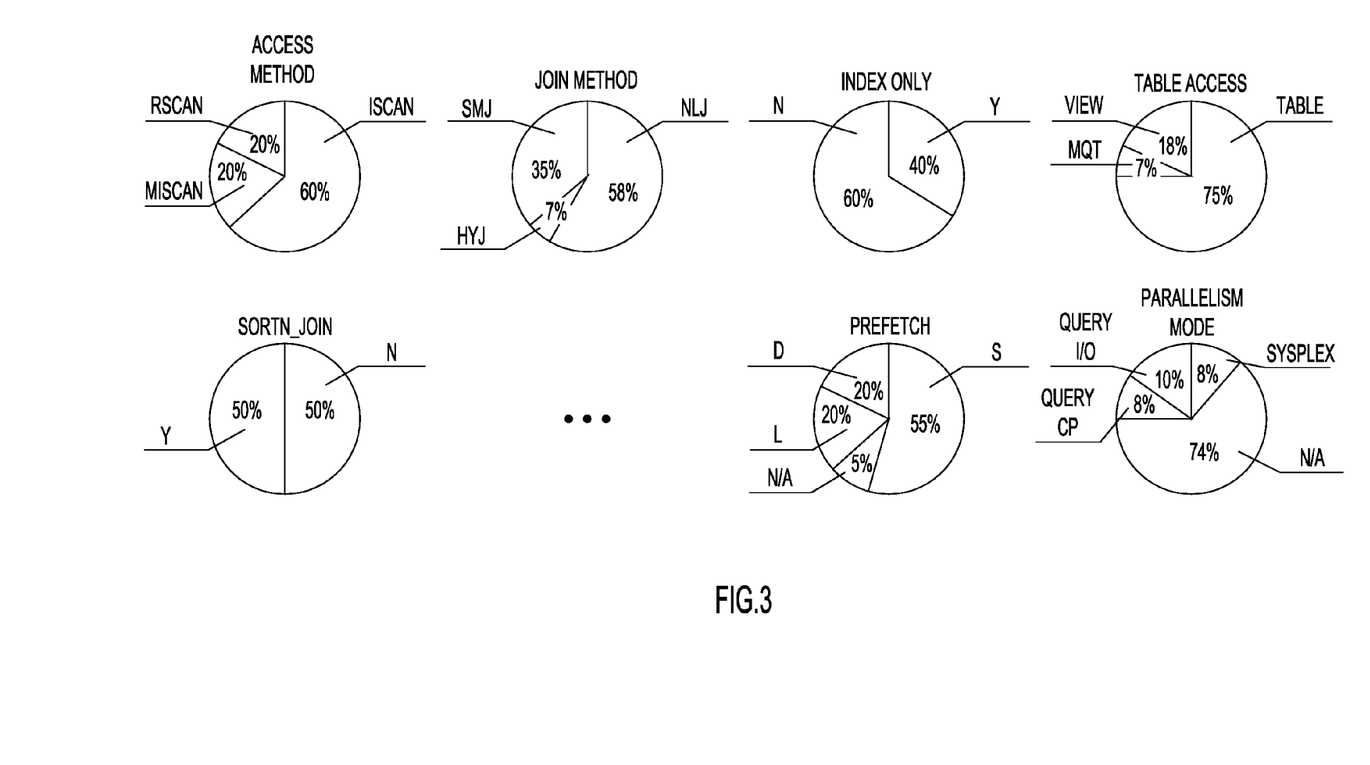
FIG. 3 shows an illustrative pie chart that records historical error information according to an embodiment of the invention.

FIG. 3 shows seven pie charts, each of which represents an access path element, and a name of the element is marked on top of each pie chart. Taking the first pie chart for example, this pie chart represents elements in the access paths of an Access Method. This pie chart is divided into three parts, which correspond to three possible values of the element respectively, i.e., RSCAN, ISCAN, and MISCAN. RSCAN occupies 20%, which means that, historically, when an error occurs in a database system, chances for a value of an Access Method element to be RSCAN are 20%, chances for the value to be MISCAN are 20%, chances for the value to be ISCAN are 60%, and the meaning of other pie charts can be concluded accordingly. It should be noted that, the pie chart shown in FIG. 3 is merely a specific way of recording historical error information, and those skilled in the art can utilize other ways to record historical error information, such as a table etc. According to an embodiment of the invention, the historical error information shown in FIG. 3 is recorded automatically by a system during running of a database system. It should also be emphasized that, for some elements of an access path, statistics about relevant history information can not be gathered. For example, for the element Joint Sequence, its value is relevant to a specific table name to be queried by a SQL instruction, and possible values of the element can only be acquired by acquiring meta information of database objects (table, index etc) related to a specific SQL instruction after the SQL instruction is received. For example, if a SQL query instruction relates to a join of Table 1, Table 2 and Table 3, then possible values of the Join Sequence are 1→2→3, 1→3→2 etc.

When calculating weights of the extended access paths in step 204, not only a weight of the element itself is used, but also a ratio of each possible value of the element recorded in historical error information is used, that is, weighting in two levels. An example of calculating weights of the extended access paths is given below. Assume the two extended access paths are (1) Access Method (RSCAN)→Join Method (SMJ), and (2) Access Method (RSCAN)→Join Method (NLJ). Assume that the weight of the Access Method element is 0.1, the weight of the Join Method element is 0.4, and further assume that historical error information is as shown in FIG. 3, then the weight for the first access path is 0.1×20%+0.4× 35%=0.16, the weight for the second access path is 0.1×20%+ 0.4×58%=0.252. Those skilled in the art should appreciate that, the above calculation process is only to illustrate one possible calculation method; in practice, plus signs on the left of the equation will increase as the number of access path elements increases.

Figure 4:
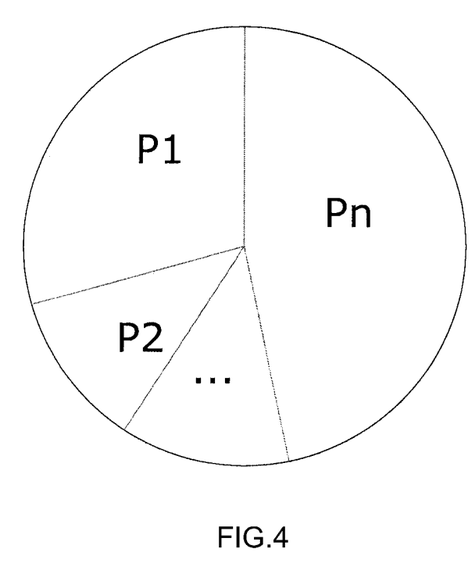
FIG. 4 shows a schematic diagram of selecting access paths by using a Monte-Carlo algorithm according to an embodiment of the invention.

Next, the method shown in FIG. 2 proceeds to step 205. In step 205, the extended access paths to be used are selected. According to an embodiment of the invention, a certain number of access paths are selected from the extended access paths randomly. According to another embodiment of the invention, a certain number of access paths are selected according to the weights calculated in step 204 in descending order. According to still another embodiment of the invention, the access paths to be executed are selected by using the weights calculated in step 204 and a Monte-Carlo algorithm. FIG. 4 shows a schematic diagram of a Monte-Carlo algorithm. The reason of using a Monte-Carlo algorithm lies in that, even if weights of some access paths are very low, they still have a certain occurrence probability from a perspective of long-term statistics; and if the access paths to be executed are merely selected according to a magnitude of weights calculated in step 204, some access paths with low weights but still might occur may get omitted. The basic principle of a Monte-Carlo algorithm is to assign a smaller area to access paths having a low weight and assign a larger area to access paths having high weights in a manner similar to a "rotating disc" (p1, p2, pn . . . as shown in FIG. 4). When selecting the access path to be executed, it is performed in a manner that simulates a rotating disc. This may be more scientific in selecting the access paths.

Next, in step 206, the SQL instruction is executed by using the selected access paths, and in step 207, it is judged whether an output result of executing the SQL instruction by using the access paths is the same as all previous results outputted by other access paths that execute the SQL instruction; if not, it is judged that there is an error in the database system in step 209. If they are the same, the method proceeds to step 208, where it is further judged whether all the selected access paths are executed completely. If not, the method returns to step 206 and repeats the executing and judging steps from 206 to 208. If they are executed completely, it means that same results of executing the SQL instruction are output for all the selected access paths, such that it is determined that there is no error in the database system in step 210.

It is to be emphasized that, steps 204 and 205 in the method shown in FIG. 2 are not necessary steps in the invention. When efficiency is not a concern, those skilled in the art can absolutely not select the access paths extended in step 203 and execute all access paths acquired through extension. Even if access paths need to be selected, calculating weights in step 204 is not necessary, because those skilled in the art can absolutely select access paths to be executed in a random manner or in a manner of limiting some conditions (such as, requiring that a value of the Access Method element must be RSCAN).

It should also be noted that, after access paths to be executed are selected in step 205, usually, feasibility of the selected access paths further needs to be verified. For example, as to the element PARALLELISM MODE, a value of one access path is SYSPLEX, but an actual system is not a SYSPLEX system, thus this access path acquired through extension is actually infeasible. The operation of verifying feasibility is not listed in the flow chart shown in FIG. 2, because a current database system also needs to perform similar operations while it parses a SQL instruction and generates an access path, and it will be omitted for brevity. Of course, the operation of verifying feasibility of access paths may be performed after access paths to be executed are selected in step 205, or may be performed at the time the extended access paths are generated in step 203.

Figure 5:
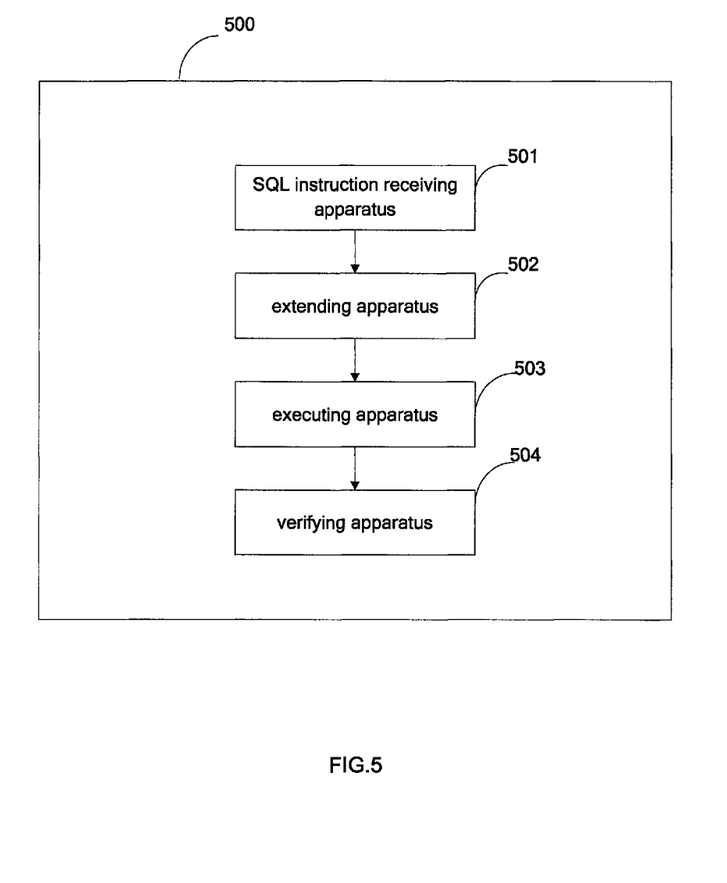
FIG. 5 shows a block chart of an apparatus for verifying correctness of a database system according to an embodiment of the invention.

FIG. 5 shows a block diagram of an apparatus for verifying correctness of a database system according to an embodiment of the invention. The system shown in FIG. 5 is represented by system 500 as a whole. Specifically, the system 500 comprises: a SQL instruction receiving apparatus 501 configured to receive a SQL instruction; an access path extending apparatus 502 configured to extend access paths of the received SQL instruction; an executing apparatus 503 configured to execute the SQL instruction by using the extended access paths; and a verifying apparatus 504 configured to verify correctness of the database system according to a result of executing the SQL instruction. Those skilled in the art should appreciate that, apparatuses 501 to 504 in the system 500 correspond to steps 101 to 104 in the method shown in FIG. 1 respectively, the description of which will be omitted here for brevity.

Figure 6:
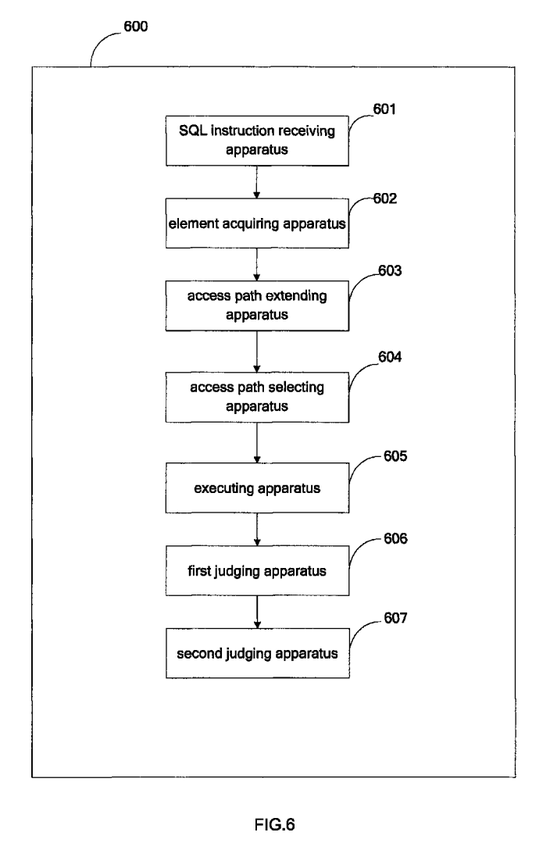
FIG. 6 shows a block chart of an apparatus for verifying correctness of a database system according to another embodiment of the invention.

FIG. 6 shows a block diagram of an apparatus for verifying correctness of a database system according to another embodiment of the invention. The system shown in FIG. 6 is represented by system 600 as a whole. Specifically, the system 600 comprises: a SQL instruction receiving apparatus 601 configured to receive a SQL instruction; an element acquiring apparatus 602 configured to acquire elements constituting an access path of the SQL instruction; an access path extending apparatus 603 configured to combine possible values of the elements to generate the extended access paths; an access path selecting apparatus 604 configured to calculate weights of the extended access paths and select the extended access paths to be used; an executing apparatus 605 configured to execute the SQL instruction by using the selected access paths; a first judging apparatus 606 configured to judge whether an execution result is the same as all outputted execution results, and if the judging result is no, determining that there is an error in the database system; and a second judging apparatus 607 configured to judge whether all the selected access paths have been executed completely, and if the judging result is no, continuing to execute access paths that have not been executed, and if the judging result is yes, determining that there is no error in the database system. Those skilled in the art should appreciate that, apparatuses 601 to 603 and 605 in the system 600 correspond to steps 201 to 203 and 206 in the method shown in FIG. 2 respectively, apparatus 604 in the system 600 corresponds to steps 204 to 205 in the method shown in FIG. 2, apparatus 606 in the system 600 corresponds to steps 207 and 209 in the method shown in FIG. 2, apparatus 607 in the system 600 corresponds to steps 208 to 210 in the method shown in FIG. 2.

Through the above description of specific embodiments, a person skilled in the art will appreciate that, the above system, apparatus and method can be implemented by using computer executable instructions and/or included in processor control codes, which are provided on carrier medium such as disk, CD or DVD-ROM, programmable memory such as read-only memory (firmware) or data carrier such as optical or electrical signal carrier. The apparatus, server of the present embodiment and components thereof can be implemented by a hardware circuit such as a large scale integrated circuit or gate arrays, semiconductors such as a logic chip or transistors, or programmable hardware devices such as a field programmable gate array, programmable logic device, or can be implemented by software executed by various types of processors, or can be implemented by a combination of the above hardware circuit and software.

Although a system and method for verifying correctness of a database system of the invention have been described above in detail in conjunction with detailed embodiments, the invention is not limited thereto. Those skilled in the art can make various variations, replacements and alternations thereto under the teaching of the invention without departing from the spirit and scope of the invention. It should be appreciated that, all such variations, replacements and alternations still fall within the protection scope of the invention which is defined by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer-implemented method for verifying correctness of a database system, comprising:
receiving a SQL instruction associated with an access path including elements arranged in an order and initial values for those elements, wherein the elements of the associated access path specify operations to implement the SQL instruction and a plurality of values are associated with each element of the associated access path;
producing extended access paths for the received SQL instruction from the associated access path by altering the initial values for elements of the associated access path to others of the plurality of associated values, wherein each extended access path includes the same order of elements as the associated access path with a different combination of values for those elements;
calculating weights of the extended access paths according to weights of the elements in the extended access paths and historical error information captured from operation of the database system and indicating chances for an error in the database system to be attributed to the associated values of the elements in the extended access paths;
executing the SQL instruction by using the extended access paths based on the calculated weights; and
verifying correctness of the database system according to a comparison of results from executing the SQL instruction using the extended access paths, wherein an error is present in the database system in response to a difference in results among the extended access paths.

2. The computer-implemented method according to claim 1, wherein producing extended access paths for the received SQL instruction comprises:
acquiring elements constituting the access path associated with the SQL instruction; and combining possible values of the elements to generate the extended access paths.

3. The computer-implemented method according to claim 1, wherein the historical error information includes a ratio of respective possible values of each element in a case that an error occurs in execution of the SQL instruction.

4. The computer-implemented method according to claim 1, wherein executing the SQL instruction by using the extended access paths comprises:
selecting the extended access paths to be used according to the calculated weights of the extended access paths; and
executing the SQL instruction by using the selected access paths.

5. The computer-implemented method according to claim 4, wherein selecting the extended access paths to be used according to the calculated weights of the extended access paths is implemented by using a Monte-Carlo algorithm.

6. The computer-implemented method according to claim 1, wherein verifying correctness of the database system comprises:
judging whether the result of executing the SQL instruction using one of the extended access paths is the same as previous results of executing the SQL instruction using at least one other of the extended access paths; and
determining that there is an error in the database system if the result is not the same as the previous results.

7. A system for verifying correctness of a database system, the system comprising:
a processor including:
a receiving apparatus configured to receive a SQL instruction associated with an access path including elements arranged in an order and initial values for those elements, wherein the elements of the associated access path specify operations to implement the SQL instruction and a plurality of values are associated with each element of the associated access path;
an access path extending apparatus configured to produce extended access paths for the received SQL instruction from the associated access path by altering the initial values for elements of the associated access path to others of the plurality of associated values, wherein each extended access path includes the same order of elements as the associated access path with a different combination of values for those elements;

an access path selecting apparatus configured to calculate weights of the extended access paths according to weights of the elements in the extended access paths and historical error information captured from operation of the database system and indicating chances for an error in the database system to be attributed to the associated values of the elements in the extended access paths;

an executing apparatus configured to execute the SQL instruction by using the extended access paths based on the calculated weights; and a verifying apparatus configured to verify correctness of the database system according to a comparison of results from executing the SQL instruction using the extended access paths, wherein an error is present in the database system in response to a difference in results among the extended access paths.

8. The system according to claim 7, wherein the access path extending apparatus comprises:
an element acquiring apparatus configured to acquire elements constituting the access path associated with the SQL instruction; and
an access path generating apparatus configured to combine possible values of the elements to generate the extended access paths.

9. The system according to claim 7, wherein therein the historical error information includes a ratio of respective possible values of each element in a case that an error occurs in execution of the SQL instruction.

10. The system according to claim 7, wherein the executing apparatus is further configured to:
select the extended access paths to be used according to the calculated weights of the extended access paths; and
execute the SQL instruction by using the selected access paths.

11. The system according to claim 10, wherein the executing apparatus is further configured to select the extended access paths to be used by using a Monte-Carlo algorithm.

12. The system according to claim 7, wherein the verifying apparatus is further configured to:
judge whether the result of executing the SQL instruction using one of the extended access paths is the same as previous results of executing the SQL instruction using at least one other of the extended access paths; and
determine that there is an error in the database system if the result is not the same as the previous results.

13. A computer program product for verifying correctness of a database system, the computer program product comprising a non-transitory computer readable storage medium having computer readable program code embodied therewith, the computer readable program code configured to:
receive a SQL instruction associated with an access path including elements arranged in an order and initial values for those elements, wherein the elements of the associated access path specify operations to implement the SQL instruction and a plurality of values are associated with each element of the associated access path;

produce extended access paths for the received SQL instruction from the associated access path by altering the initial values for elements of the associated access path to others of the plurality of associated values, wherein each extended access path includes the same order of elements as the associated access path with a different combination of values for those elements;

calculate weights of the extended access paths according to weights of the elements in the extended access paths and historical error information captured from operation of the database system and indicating chances for an error in the database system to be attributed to the associated values of the elements in the extended access paths;

execute the SQL instruction by using the extended access paths based on the calculated weights; and verify correctness of the database system according to a comparison of results from executing the SQL instruction using the extended access paths, wherein an error is present in the database system in response to a difference in results among the extended access paths.

14. The computer program product according to claim 13, wherein producing extended access paths for the received SQL instruction comprises:
acquiring elements constituting the access path associated with the SQL instruction; and combining possible values of the elements to generate the extended access paths.

15. The computer program product according to claim 13, wherein the historical error information includes a ratio of respective possible values of each element in a case that an error occurs in execution of the SQL instruction.

16. The computer program product according to claim 13, wherein executing the SQL instruction by using the extended access paths comprises:
selecting the extended access paths to be used according to the calculated weights of the extended access paths; and
executing the SQL instruction by using the selected access paths.

17. The computer program product according to claim 16, wherein selecting the extended access paths to be used according to the calculated weights of the extended access paths is implemented by using a Monte-Carlo algorithm.

18. The computer program product according to claim 13, wherein verifying correctness of the database system comprises:
judging whether the result of executing the SQL instruction using one of the extended access paths is the same as previous results of executing the SQL instruction using at least one other of the extended access paths; and
determining that there is an error in the database system if the result is not the same as the previous results.

* * * * *